United States Patent
Hopson et al.

(10) Patent No.: US 7,222,426 B2
(45) Date of Patent: May 29, 2007

(54) METHOD OF FORMING A CONSTANT VELOCITY JOINT

(75) Inventors: Michael W. Hopson, Clinton Township, MI (US); Glenn C. Ringle, Monroe, MI (US); Richard L. Seidel, Macomb, MI (US); Arvind Srinivasan, Lasalle (CA)

(73) Assignee: Automotive Components Holdings, LLC, Dearborn, MI (US)

( * ) Notice: Subject to any disclaimer, the term of this patent is extended or adjusted under 35 U.S.C. 154(b) by 517 days.

(21) Appl. No.: 10/755,805

(22) Filed: Jan. 12, 2004

(65) Prior Publication Data

US 2005/0150111 A1    Jul. 14, 2005

(51) Int. Cl.
*B23P 17/00* (2006.01)
(52) U.S. Cl. .................. 29/898.063; 29/898
(58) Field of Classification Search ........... 29/898.063, 29/404.1, 898.062, 898.06, 898, 426.1, 426.4, 29/428, 445, 453; 464/139–146, 804–906
See application file for complete search history.

(56) References Cited

U.S. PATENT DOCUMENTS

| | | | | |
|---|---|---|---|---|
| 5,363,601 A | * | 11/1994 | Baltazar et al. | 451/540 |
| 5,647,800 A | * | 7/1997 | Warnke et al. | 464/144 |
| 5,803,993 A | * | 9/1998 | Yoshida et al. | 148/320 |
| 6,672,965 B2 | * | 1/2004 | Hildebrandt et al. | 464/145 |
| 6,736,729 B2 | * | 5/2004 | Wang et al. | 464/15 |
| 2006/0009298 A1 | * | 1/2006 | Dine et al. | 464/145 |

FOREIGN PATENT DOCUMENTS

KR    2002088800    * 11/2002

* cited by examiner

*Primary Examiner*—John C. Hong

(57) ABSTRACT

The present invention is directed to a constant velocity joint ("CV joint") and, more particularly, to a Rzeppa CV joint and method of forming the same. The method generally includes the steps of forming a bell shaped outer bearing race and separating the bell shaped outer bearing race into a disc shaped outer bearing race and a stub shaft. The method may further include the step of machining the bell shaped outer bearing race to create the stub shaft integrally connected to the disc shaped outer bearing race, before separating the bell shaped outer bearing race into the disc shaped outer bearing race and the stub shaft.

17 Claims, 5 Drawing Sheets

METHOD OF FORMING A CONSTANT VELOCITY JOINT

BACKGROUND OF THE INVENTION

The present invention is directed to a constant velocity joint ("CV joint") and method of forming the same.

Two types of Rzeppa CV joints are commonly used in vehicles. The first type is a bell shaped CV joint and the second type is a disc shaped CV joint. The bell shaped CV joint is formed with a bell shaped outer bearing race having a bell shaft protruding from the crown of the bell. The bell and bell shaft are generally aligned symmetrically about a bell axis. Reference points may be forged on the bell and bell shaft for locating the bell axis during machining. The reference points allow precise and accurate machining of the bell shaped outer bearing race to provide a well balanced outer bearing race about the bell axis.

Disc shaped CV joints typically include a disc shaped outer bearing race, an inner bearing race, and stub shaft having a hub on one end. Alternatively, the disc shaped CV joint may be formed without the stub shaft and instead be flange mounted to a shaft. When assembled, the inner race fits within the outer disc race, with ball bearings located therebetween. A splined portion of the stub shaft then fits within the inner bearing race, specifically a splined hub on the inner bearing race. The CV joint provides articulation by the outer bearing race, connected to one shaft of the driveshaft, articulating relative to the inner bearing race and stub shaft, connected to the other shaft of the driveshaft. The outer bearing race and stub shaft are separately forged with each having their own axis. Therefore, during machining, the outer bearing race and stub shaft are machined about their respective axes, which may not be in alignment when assembled into a CV joint. To provide a CV joint with minimal noise, vibration, and harshness issues, the axes should be in alignment with one another when assembled and in alignment with the axis of the assembled CV joint. Another problem with disc shaped CV joints is that they are typically difficult to precisely and accurately manufacture, because each part is separately formed and machined. Other problems include finding the axis of each part during the machining process, especially the disc shaped outer bearing race. Each of the above problems makes it difficult to efficiently machine and assemble the CV joint so that the axes of each part are aligned and balanced to reduce or eliminate noise, vibration, and harshness issues. Another problem with disc type CV joints is that it currently is not possible to efficiently and repeatedly form the outer disc bearing race to near net shape tolerances so that the amount of machining is limited, especially machining of bearing races.

SUMMARY OF THE INVENTION

The present invention is directed to a constant velocity joint ("CV joint") and, more particularly, to a Rzeppa CV joint and method of forming the same. The method generally includes the steps of forming a bell shaped outer bearing race and separating the bell shaped outer bearing race into a disc shaped outer bearing race and a stub shaft. The method may further include the step of machining the bell shaped outer bearing race to create the stub shaft integrally connected to the disc shaped outer bearing race, before separating the bell shaped outer bearing race into the disc shaped outer bearing race and the stub shaft.

The bell shaped outer bearing race may include a bell axis, an outer surface and a first face and the step of machining the bell shaped outer bearing race may further include the step of creating reference datums on at least one of the outer surface and first face of the integrally coupled stub shaft and disc shaped outer bearing race. The step of machining the bell shaped outer bearing race may also includes the step of using a reference point and an outer bearing recess and/or a cage track to determine the bell axis. Splines, snap ring grooves and boot grooves may also be formed on the stub shaft.

The method of forming a constant velocity joint may also include the steps of, forming a bell shaped outer bearing race having a housing defining a cavity, a crown, and a bell shaft extending from said crown, and separating the housing defining a cavity from the crown and the bell shaft. The bell shaped outer bearing race may further include a bell axis, a first reference point defined by at least one of the crown and the bell shaft, a cage track and an outer bearing recess, and wherein the method further includes the step of machining the bell shaped outer bearing race about the bell axis using the reference point and the outer bearing recess and/or the cage track as references. Reference datums may also be created on at least one of the said housing and stub shaft during the machining process for use later in locating the bell axis.

The method of the present invention may also be used to form a cross groove CV joint in place of a Rzeppa CV joint.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 7:
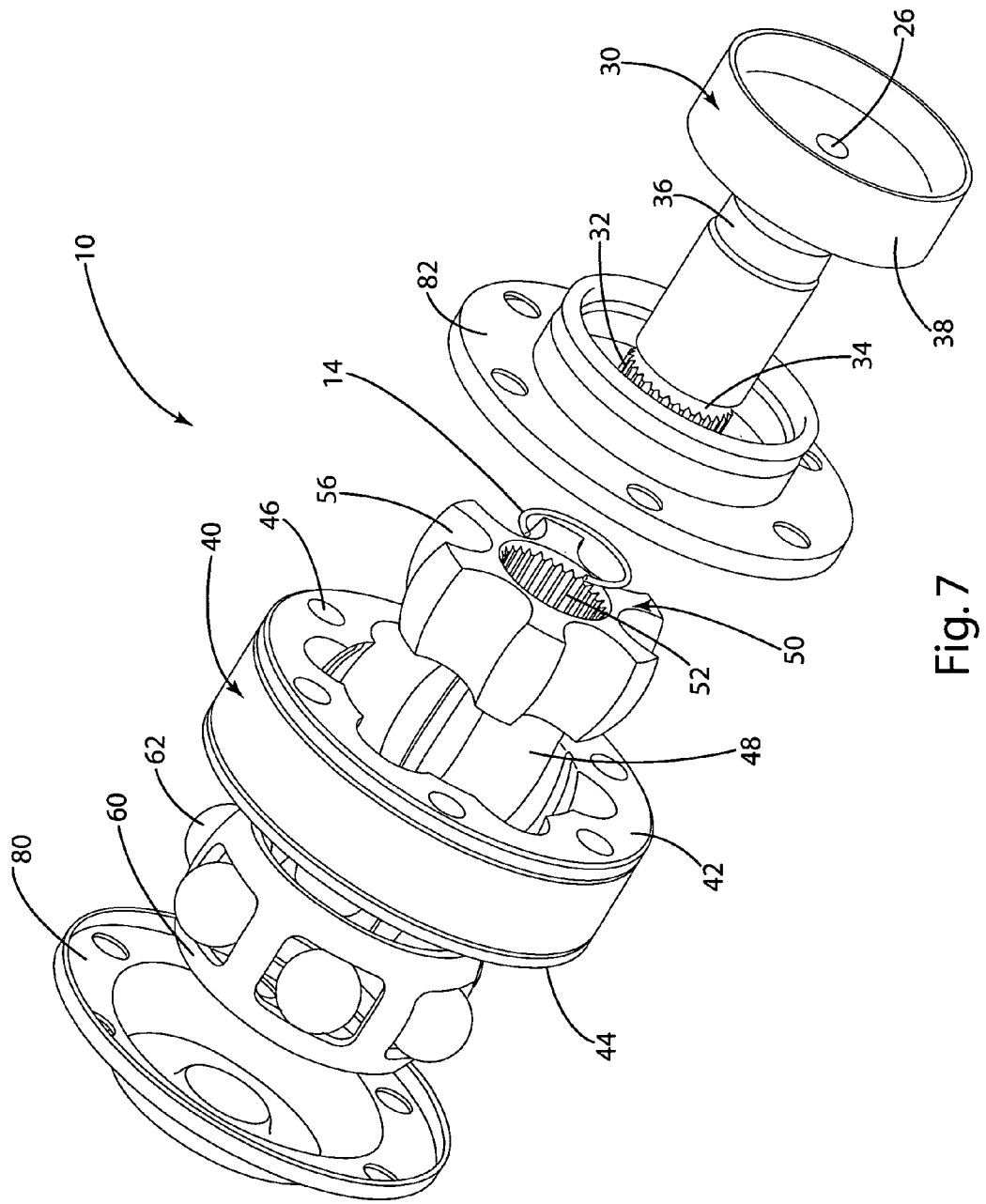
FIG. 7 is an exploded perspective view of the constant velocity joint.
Figure 8:
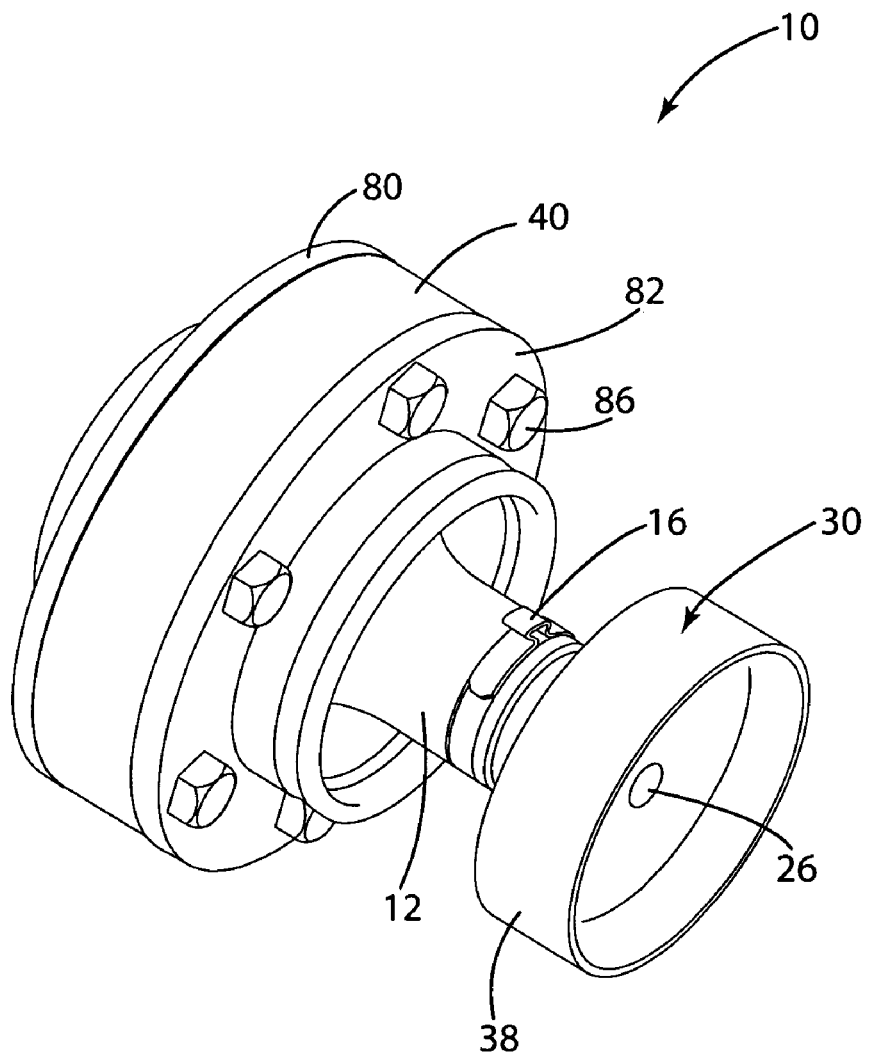
FIG. 8 is an assembled perspective view of the constant velocity joint.

An illustrative embodiment of a CV joint 10 constructed and assembled in accordance with the present invention is shown in FIG. 8. As further illustrated in FIG. 7, the CV joint 10 generally includes a disc shaped outer bearing race 40, an inner bearing race 50, and a stub shaft 30. The CV joint 10 is constructed by forming a bell shaped outer bearing race 20

(FIGS. 1 and 2), machining the bell shaped outer bearing race and separating the bell shaped outer bearing race 20 to create both the stub shaft 30 and the disc shaped outer bearing race 40. By forming the stub shaft 30 and disc shaped outer bearing race 40 from the bell shaped outer bearing race 20, a balanced CV joint 10 having reduced noise, vibration, and harshness issues may be easily constructed and assembled without many of the problems associated with manufacturing typical disc shaped CV joints. Forming the stub shaft 30 and disc shaped outer bearing race 40 from the bell shaped outer bearing race 20 also facilitates machining of each component in an accurate and precise manner. Further by forming the disc shaped outer bearing race integrally connected to the stub shaft allows the disc shaped outer bearing race 40 to be near net forged, thereby limiting the amount of machining necessary. In some embodiments, the near net forged surfaces of the disc shaped outer bearing race 40 may be formed within 0.20 mm of the final desired surface.

Figure 1:
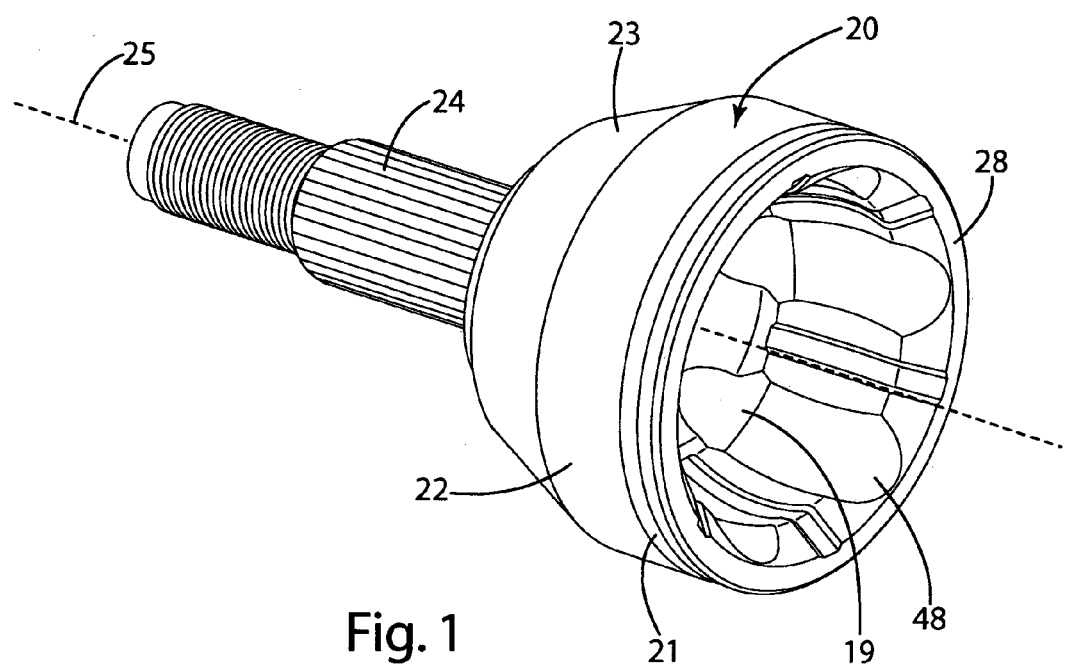
FIG. 1 is a perspective view of the bell shaped forging.
Figure 2:
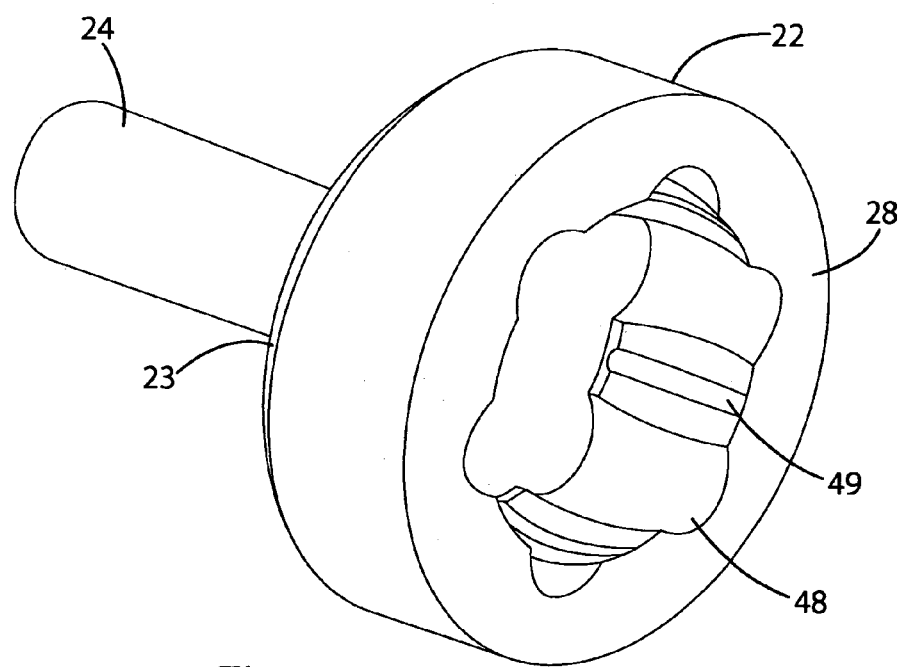
FIG. 2 is a perspective view of an alternative bell shaped forging.
Figure 5:
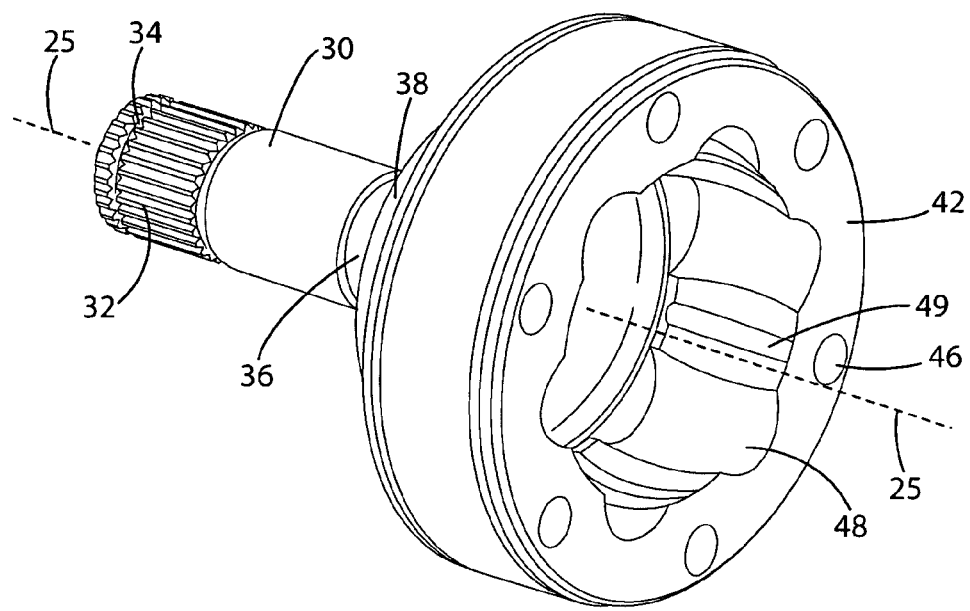
FIG. 5 is a perspective view of the machined integrally connected stub shaft and outer disc bearing race.

The bell shaped outer bearing race 20 is formed (Step 102) in a generally conventional manner such as by forging. The bell shaped outer bearing race 20 includes a housing 21 defining a cavity 19, a crown 23, and a bell shaft 24 extending from the crown (FIG. 2). The housing 21 includes an outer bell surface 22, outer bearing recesses 48, cage tracks 49 and an outer bell face 28. The bell shaped outer bearing race 20 may even be a conventionally made bell shaped outer bearing race used in a bell shaped CV joint, as shown in FIG. 1. The bell shaped outer bearing race 20 includes a bell axis 25 and at least one reference point 26. In the illustrated embodiment reference points are located on the crown 23 within the cavity 19 and on the end of the bell shaft 24 (FIGS. 2 and 5). The reference points 26 are used to help position the bell shaped outer bearing race 20 during machining. Even though the bell shaped outer bearing race 20 is referred to in this application and illustrated as being bell shaped, it should be readily recognizable that the bell shaped outer bearing race does not have to be completely bell shaped. For example, the bell shaped outer bearing race 20 may be formed as a stub shaft 30 integrally connected to the outer bearing race 40 to minimize the amount of machining before the stub shaft and outer bearing race are separated. In the illustrated embodiment, the outer bearing recesses 48 and cage tracks 49 are near net forged to reduce machining. The bell shaped outer bearing race may be near net formed by using a collapsible punch as is well known in the art.

Figure 3:
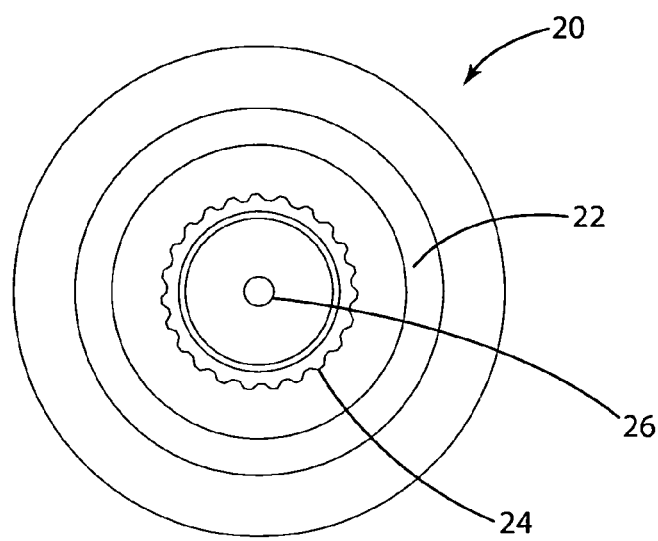
FIG. 3 is a rear elevational view of the bell shaped forging showing the reference points.
Figure 4:
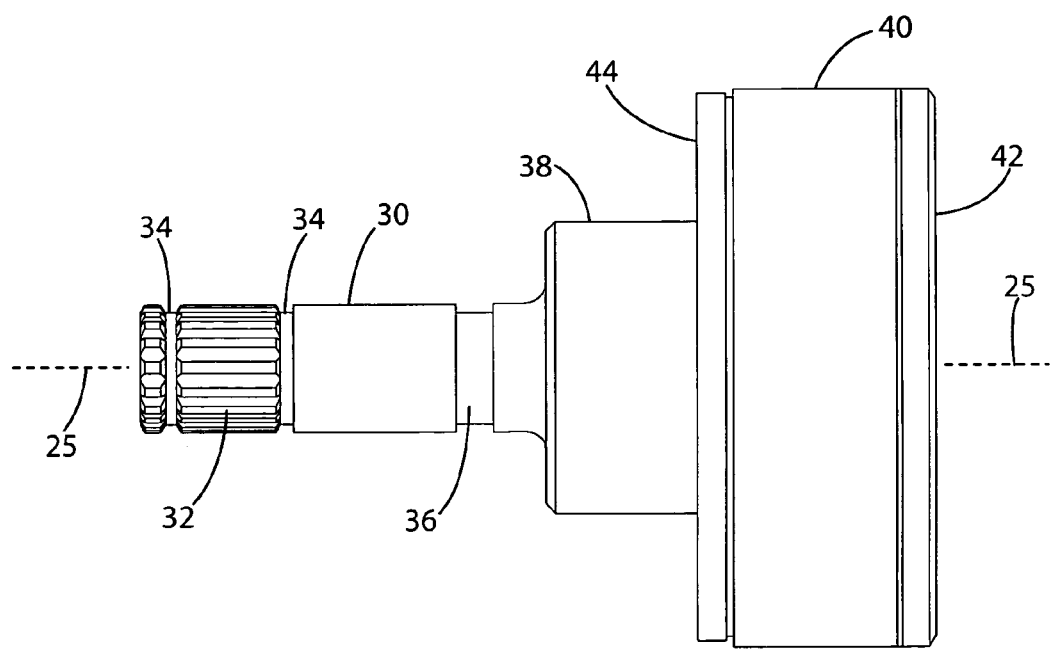
FIG. 4 is a front elevation of the machined integrally connected stub shaft and outer disc bearing race.

Next, the bell shaped outer bearing race 20 is machined using at least one of the reference points 26 to create an integrally connected stub shaft 30 and outer bearing race 40 (Step 104). To machine the outer surface 22 about the bell axis, at least one outer ball recess 48 or cage track may be used in conjunction with at least one reference point 26 to locate the bell axis 25. In the illustrated embodiment, a three prong chuck engages the outer bearing recesses 48 and at lest one reference point 26 during machining. During the machining process or after heat treating, the outer bearing recesses 48 may be further machined and polished to their final shape, and the first face 42 of the outer bearing race 40 may be created by machining the outer bell face 28. The second face 44 of the outer bearing race 40 is also partially created during the machining process of the outer bell surface 22 and further created as the stub shaft 30 is separated from the outer bearing race 40 as described below. Splines 32, snap ring grooves 34, and a boot clip groove 36 may also be machined while the stub shaft 30 is connected to the disc shaped outer bearing race 40. The majority of machining is generally done to the outer bell surface 22 to remove excess material in order to create the stub shaft 30, specifically the stub shaft hub 38 integrally connected to the outer disc bearing race 40. Performing the machining process while the stub shaft 30 is connected to the disc shaped outer bearing race 40 ensures that, when separated, the stub shaft axis 31 is in alignment with the outer bearing race axis 41. Because both the stub shaft 30 and disc shaped outer bearing race 40 are machined while connected, using the reference points 26 for locating the bell axis 25, they are balanced about aligned axes. Using the outer bearing recesses 44 or cage tracks 49 with at least one reference point allow the outer surface 22 to be machined to create reference datums used in the machining of the outer bearing recesses 48 or other operations. The reference datums may be the machined outer surface 22 shown in FIG. 3. By forming a bell shaped outer bearing race 20 such as by forming and then machining, a substantial amount of machining may be eliminated, thereby reducing costs associated with the manufacturing process, due to the ability to near net forge portions of the bell shaped outer bearing race 20.

Figure 6:
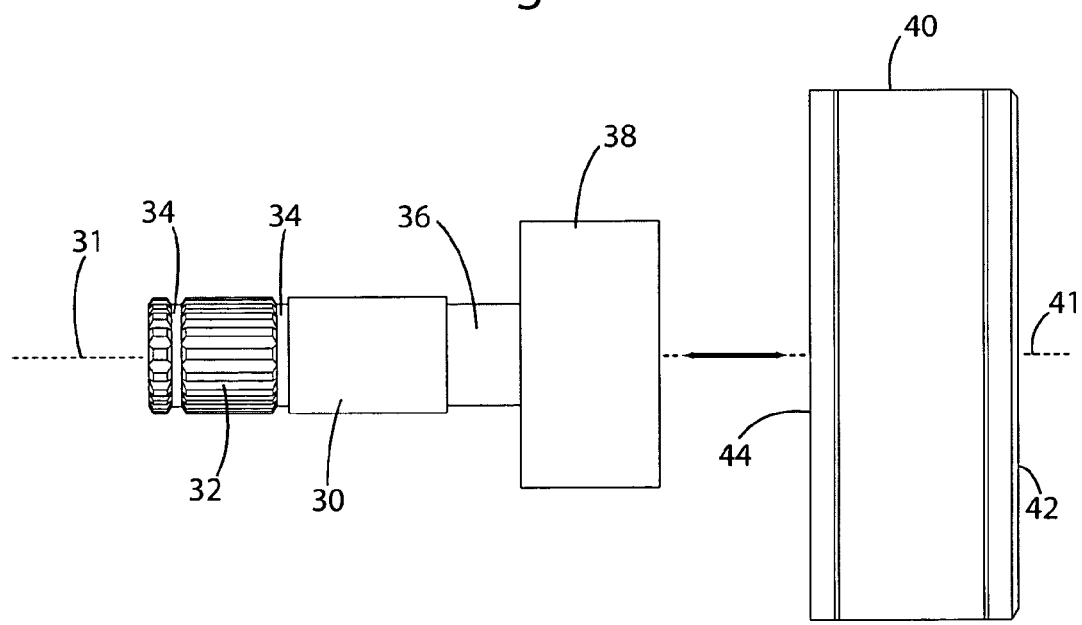
FIG. 6 is a side elevation view of the separated stub shaft and outer disc bearing race.

The machined bell shaped outer bearing race 20 is then separated into the stub shaft 30 and the disc shaped outer bearing race 40 (Step 106). During separation, the second face 44 of the disc shaped outer bearing race 40 may be created (FIG. 6). Minor machining operations may be further performed to the disc shaped outer bearing race 40 and stub shaft 30 once they are separated. As stated above, by forming the bell shaped outer bearing race 20, machining the bell shaped outer bearing race to create the stub shaft 30 and outer bearing race 40 as one integral piece, and then separating the stub shaft 30 from the disc shaped outer bearing race 40 creates a CV joint where the stub shaft and disc shaped outer bearing race have concentric axes when assembled into the CV joint 10. Therefore, when the CV joint 10 is assembled the stub shaft 30 and disc shaped outer bearing race 40 are balanced about the same axis and each part is efficiently machined. Further, machining and separating using the reference points 26 as reference to the axis eliminates problems associated with locating the axis of the disc shaped outer bearing race 40 as typically encountered during the machining of disc type CV joints. The disc shaped outer bearing race 40 may further include passages 46 added before or after the outer bearing race 40 is separated from the stub shaft 30 (FIG. 5). These passages 46 may receive fasteners used to assemble the CV joint 10.

The CV joint 10 is then assembled (Step 108) as shown in FIGS. 5 and 6. The CV joint 10 further includes an inner bearing race 50 having a splined hub 52 to receive the splined portion of the stub shaft 30 (FIG. 7). The inner bearing recesses 56 on the inner bearing race 50 are aligned with the outer bearing recesses 48 on the disc shaped outer bearing race 40 with a ball cage 60 containing ball bearings 62 therebetween. The ball cage 60 may engage the cage tracks 49 as is well known in the art. Snap clips 14 may be used to couple the stub shaft 30 to the inner and outer bearing races 40, 50. A can cover 80 and boot can 82 surround the inner and outer bearing races 40, 50 to protect them from dirt and contamination. The can cover 80 and boot can 82 may be secured to the outer bearing race 40 using the fasteners 86 as shown in FIG. 8. The boot 12 may be added and secured by the boot clips 16 to the boot can 82. Generally, once the stub shaft 30 is separated from the disc shaped outer bearing race 40, the CV joint 10 is assembled as is well known in the art for a typical disc CV joint.

Forming the disc shaped outer bearing race 40 and stub shaft 30 as a single integral piece allows for easier machining and a better balanced CV joint. Manufacturing costs are also reduced by eliminating complicated processes to determine the axis of the disc shaped outer bearing race 40 for machining. Reference datums may also be easily created for additional machining operations. As stated above, a typical bell shaped outer bearing race may be used as the bell shaped outer bearing race 20. The bell shaped outer bearing race 20 may also be formed by forging a shape close to the integrally connected outer bearing race and stub shaft. The bell shaped outer bearing race 20 is then machined and separated to provide the resulting stub shaft 30 and outer bearing race 40. The bell shaped outer bearing race 20 may also be near net formed to minimize the amount of machining in forming the outer disc bearing race 40.

The method of the present invention may also be used to form a cross groove CV joint in place of a Rzeppa CV joint.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A method of forming a constant velocity joint comprising:
    forming a bell shaped outer bearing race;
    machining said bell shaped outer bearing race to create a stub shaft integrally connected to a disc shaped outer bearing race;
    separating said bell shaped outer bearing race into said disc shaped outer bearing race and said stub shaft; and
    assembling the disc shaped outer bearing race and the stub shaft into constant velocity joint.

2. The method of claim 1 wherein said bell shaped outer bearing race includes a bell axis, an outer surface and a first face and wherein said step of machining said bell shaped outer bearing race further includes the step of creating reference datums on at least one of the outer surface and the first face of said integrally coupled stub shaft and disc shaped outer bearing race.

3. The method of claim 1 wherein said bell shaped outer bearing race includes a bell axis, a reference point, and an outer bearing recess and wherein the step of machining said bell shaped outer bearing race includes the step of using the reference point and the outer bearing recess to determine the bell axis.

4. The method of claim 1 wherein said bell shaped outer bearing recess includes a bell axis, a reference point and a cage track, and wherein the step of machining the bell shaped outer bearing race includes the step of using the reference point and the cage track to determine the bell axis.

5. The method of claim 1 wherein said step of machining said bell shaped outer bearing race further includes the step of forming splines on said stub shaft.

6. The method of claim 5 wherein said step of machining said bell shaped outer bearing race further includes the step of forming snap ring grooves on said stub shaft.

7. The method of claim 6 wherein said step of machining said bell shaped outer bearing race further includes the step of forming a boot groove on said stub shall.

8. The method of claim 5 further including the steps of:
    providing an inner bearing race having a splined hub;
    assembling said inner bearing race into said disc shaped outer bearing race; and
    coupling said splined stub shaft to said splined hub.

9. A method of forming a constant velocity joint comprising:
    forming a bell shaped outer bearing race having a housing defining a cavity, a crown, and a bell shaft extending from said crown;
    machining said bell shaped outer bearing race about a bell axis using a reference point to form a stub shaft from said crown and said bell shaft and an outer disc bearing race from said housing;
    separating said housing defining a cavity from said crown and said bell shaft after said step of machining; and
    assembling said housing and said crown and bell shaft into said constant velocity joint.

10. The method of claim 9 wherein said reference point is defined by at least one of said crown and said bell shaft and an outer bearing recess.

11. The method of claim 9 wherein said reference point defined by at least one of said crown and said bell shaft and a cage track, and wherein said method further includes the step of machining said cage track about said bell axis using said reference point and said cage track to form said stub shaft from said crown and said bell shaft and outer disc bearing race from said housing.

12. The method of claim 9 wherein said bell shaped outer bearing race further includes an outer bell face and wherein said step of machining said bell shaped outer bearing race further includes the step of machining said outer bell face to form a first face of said outer disc bearing race.

13. The method of claim 12 wherein said step of separating said housing defining said cavity from said crown and shaft further includes the step of creating a second face of said outer disc bearing race.

14. The method of claim 9 wherein said step of machining said bell shaped outer bearing race further includes the steps of forming splines on said stub shaft, and at least one snap ring groove on said stub shaft.

15. The method of claim 14 further including the steps of: providing an inner bearing race having a splined hub; coupling said splined stub shaft to said inner bearing race; and displacing a snap ring within said snap ring groove.

16. The method of claim 9 wherein said step of machining further includes the step of creating reference datums on at least one of said housing and said stub shaft.

17. The method of claim 16 wherein said housing further includes outer bearing recesses and a bell axis and further includes the step of machining said outer bearing recess using said reference datums to locate said bell axis.

* * * * *